United States Patent
Macdonald et al.

(10) Patent No.: US 9,395,798 B2
(45) Date of Patent: Jul. 19, 2016

(54) AUTOMATIC PROXIMITY-BASED ADJUSTMENTS TO ENERGY MANAGEMENT ROUTINES

(71) Applicant: General Motors LLC, Detroit, MI (US)

(72) Inventors: Andrew J. Macdonald, Grosse Pointe Park, MI (US); Mark S. Frye, Grosse Pointe Woods, MI (US)

(73) Assignee: General Motors LLC, Detroit, MI (US)

( * ) Notice: Subject to any disclaimer, the term of this patent is extended or adjusted under 35 U.S.C. 154(b) by 29 days.

(21) Appl. No.: 14/297,942

(22) Filed: Jun. 6, 2014

(65) Prior Publication Data

US 2015/0355703 A1 Dec. 10, 2015

(51) Int. Cl.
*G06F 7/00* (2006.01)
*G06F 1/32* (2006.01)

(52) U.S. Cl.
CPC ............ *G06F 1/3246* (2013.01); *G06F 1/3231* (2013.01)

(58) Field of Classification Search
CPC ................................. G06F 7/00; G07C 5/008
USPC .......... 701/36, 31.5, 32.4, 517; 455/574, 557, 455/572, 556.1
See application file for complete search history.

(56) References Cited

U.S. PATENT DOCUMENTS

| | | | |
|---|---|---|---|
| 2004/0198466 A1* | 10/2004 | Walby et al. | 455/574 |
| 2014/0074353 A1* | 3/2014 | Lee et al. | 701/36 |
| 2015/0032291 A1* | 1/2015 | Lowrey et al. | 701/2 |

* cited by examiner

*Primary Examiner* — Luke Huynh
(74) *Attorney, Agent, or Firm* — Leydig, Voit & Mayer, Ltd.

(57) ABSTRACT

A method is provided for energy management for a telematics unit of a telematics-equipped vehicle. The method includes: determining, by a processor, that a mobile device is co-located with the telematics unit while vehicle ignition of the vehicle is on, wherein the mobile device is registered as being associated with the telematics unit; determining, by the processor, that the vehicle ignition has been turned off; determining, by the processor, a location of the vehicle corresponding to where the vehicle ignition was turned off and determining, by the processor, a location of the mobile device; and implementing, by the processor, situation-specific energy management based on the determined location of the vehicle and the determined location of the mobile device.

20 Claims, 5 Drawing Sheets

AUTOMATIC PROXIMITY-BASED ADJUSTMENTS TO ENERGY MANAGEMENT ROUTINES

FIELD

The present disclosure relates generally to vehicle telematics systems and more particularly to automatic adjustment of post-ignition-off energy management routines for telematics units.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Upon activation, the telematics unit can be utilized to provide a subscriber with telematics services such as those described herein.

When the ignition of the mobile vehicle is off, the vehicle's telematics unit is placed into different states, such as a standby state, a discontinuous-reception (DRx) state having DRx cycles, and a powered-down state. Vehicle hardware, such as a telematics unit, may be placed into the standby state or DRx state to minimize power drain on the vehicle battery while maintaining at least partial availability for communication.

While the telematics unit is in a standby state, the network access device (NAD) of the telematics unit is active and able to receive wireless communications. While the telematics unit is in a DRx state, DRx cycles occur that include times where the NAD is off and unable to receive wireless communications, as well as times where the NAD is on and able to receive commands wirelessly. During standby and DRx periods, service requests—such as maintenance and diagnostic functions, system updates, vehicle position determination, unlocking of the doors, or vehicle alarm silencing—may be sent to the telematics unit when the NAD is on, and the telematics unit communicates with and/or causes appropriate vehicle hardware to be turned on to perform the requested service. DRx cycles consume power, and after a certain amount of time, the vehicle may end the DRx period and switch the telematics unit to an off state. After being switched to an off mode, the telematics unit and other vehicle hardware becomes unavailable for communication purposes.

Conventionally, vehicles are assigned a predetermined standby and DRx schedule that they follow each time the vehicle ignition is shut off, with the vehicles and corresponding telematics unit eventually being switched to an off state where communications with the telematics unit cannot be processed after duration for the DRx state is over. However, such predetermined standby and DRx schedules do not account for the variability of user behavior and the needs of particular users in particular situations and at particular times.

The above body of information is provided for the convenience of the reader. The foregoing describes a suitable environment for which the described system and method are provided, and is not an attempt to review or catalog the prior art.

SUMMARY

In an implementation, the invention provides a method for energy management for a telematics unit of a telematics-equipped vehicle. The method includes: determining, by a processor, that a mobile device is co-located with the telematics unit while vehicle ignition of the vehicle is on, wherein the mobile device is registered as being associated with the telematics unit; determining, by the processor, that the vehicle ignition has been turned off; determining, by the processor, a location of the vehicle corresponding to where the vehicle ignition was turned off and determining, by the processor, a location of the mobile device; and implementing, by the processor, situation-specific energy management based on the determined location of the vehicle and the determined location of the mobile device.

BRIEF DESCRIPTION OF THE SEVERAL VIEWS OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Before discussing the details of the invention and the environment wherein the invention may be used, a brief overview is given to guide the reader. In general terms, not intended to limit the claims, systems and methods are described herein for automatically adjusting post-ignition-off energy management routines for a vehicle telematics unit based on vehicle location and/or mobile device location (of a mobile device associated with a user of the telematics unit).

Figure 1:
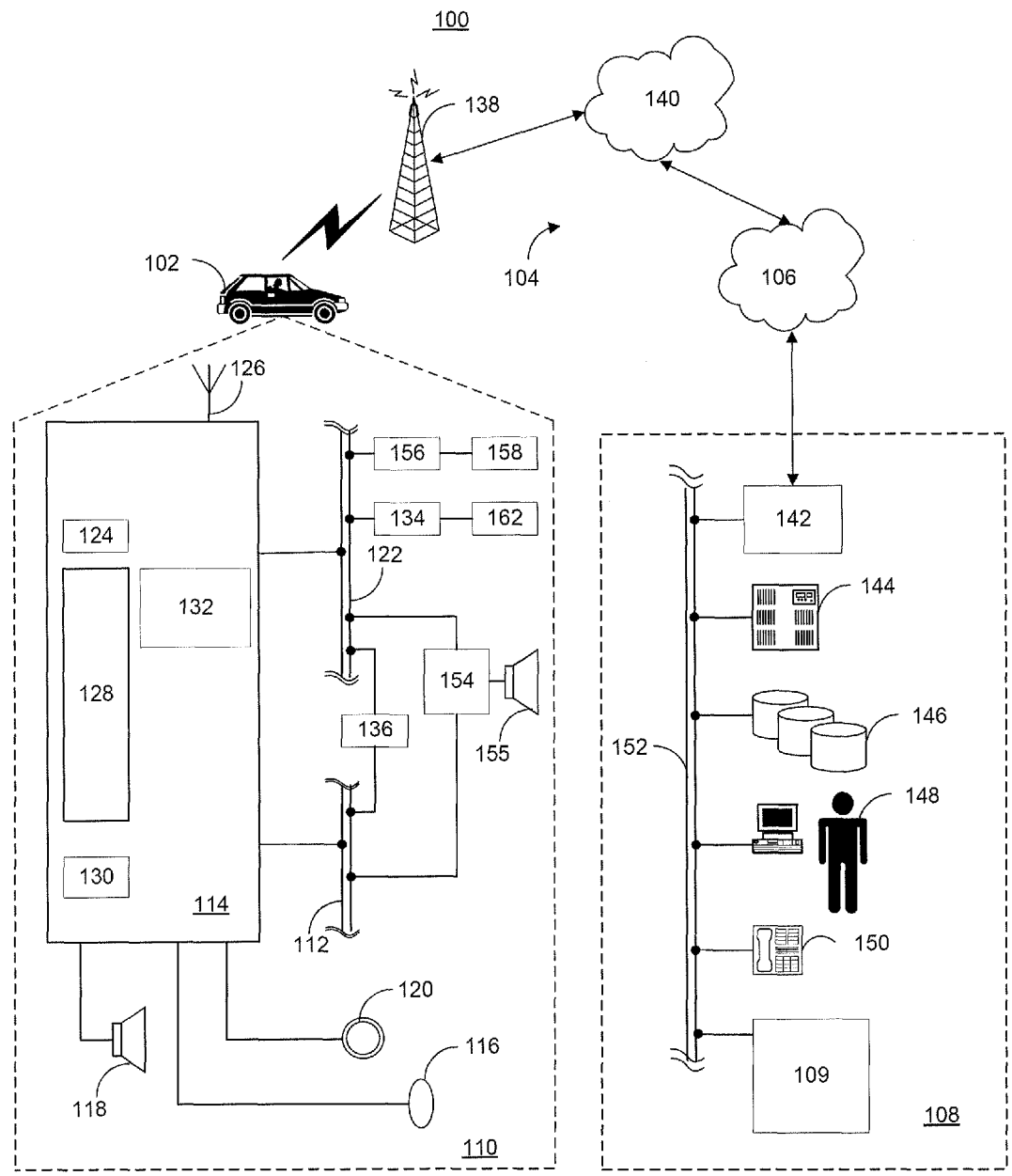
FIG. 1 is a schematic diagram of an operating environment for a mobile vehicle communication system usable in implementations of the described principles.

An exemplary computing and network communications environment is described hereinafter. It will be appreciated that the described environment is an example, and does not imply any limitation regarding the use of other environments to practice the invention. With reference to FIG. 1 there is shown an example of a communication system 100 that may be used with the present method and system and generally includes a vehicle 102, a mobile wireless network system 104, a land network 106 and a communications center 108. It should be appreciated that the overall architecture, setup and operation, as well as the individual components of the communication system 100 is generally known in the art. In accordance with an illustrative example, the communication center 108 includes a GNSS control center 109 incorporating functional components facilitating over-the-air configuration of GNSS receivers integrated with/within telematics units such as a telematics unit 114. Thus, the following paragraphs provide a brief overview of an exemplary communication system 100. However, other systems are contemplated that are capable of incorporating the described GNSS receiver and GNSS control center functionality described herein.

The vehicle 102 is, for example, a motorcycle, a car, a truck, a recreational vehicle (RV), a boat, a plane, etc. The vehicle 102 is equipped with suitable hardware and software that configures/adapts the vehicle 102 to facilitate communications with the communications center 108 via mobile wireless communications. The vehicle 102 includes hardware 110 such as, for example, the telematics unit 114, a microphone 116, a speaker 118 and buttons and/or controls 120 integrated with the telematics unit 114.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 provides a variety of services through communications with the communications center 108 (or "call center"). The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114. These services may also be provided via the communications center 108 in combination with applications executed on a mobile device, such as a smartphone, or, alternatively, via communications between the telematics unit 114 and a mobile device that do not involve the communications center 108.

The telematics unit 114 provides, for users, an extensive/extensible set of services. Examples of such services include: GNSS-based mapping/location identification, turn-by-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle.

GNSS navigation services are, for example, implemented based on the geographic position information of the vehicle provided by the GNSS component 132. A user of the telematics unit 114 enters a destination, for example, using inputs associated with the GNSS component 132, and a route to a destination may be calculated based on the destination address and a current position of the vehicle determined at approximately the time of route calculation. Turn-by-turn (TBT) directions may further be provided on a display screen corresponding to the GNSS component and/or through vocal directions provided through a vehicle audio component 154. It will be appreciated that the calculation-related processing may occur at the telematics unit or may occur at a communications center 108.

The telematics unit 114 also supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback.

The above-listed services are by no means an exhaustive list of the current and potential capabilities of the telematics unit 114, as should be appreciated by those skilled in the art. The above examples are merely a small subset of the services that the telematics unit 114 is capable of offering to users. For example, other service include but are not limited to: vehicle door unlocking, diagnostic monitoring, firmware/software updating, emergency or theft-related services, etc. Moreover, the telematics unit 114 may include a number of known components in addition to those explicitly described above.

Vehicle communications may use radio transmissions to establish a communications channel with the mobile wireless network system 104 so that both voice and data signals can be sent and received via the communications channel. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component.

The microphone 116 provides the driver or other vehicle occupant with a way to input verbal or other auditory commands, and can be equipped with an embedded voice processing unit utilizing human/machine interface (HMI) technology. The speaker 118 provides verbal output to the vehicle occupants and can be either a stand-alone speaker specifically dedicated for use with the telematics unit 114 or can be part of an audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 may contain a speaker system 155, or may utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

A set of vehicle sensors 162, connected to various ones of a set of sensor interface modules 134 are operatively connected to the vehicle bus 122. Examples of the vehicle sensors 162 include but are not limited to gyroscopes, accelerometers, magnetometers, emission detection and/or control sensors, and the like. Examples of the sensor interface modules 134 include ones for power train control, climate control, and body control.

The mobile wireless network system 104 is, for example, a cellular telephone network system or any other suitable wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 with the land network 106. For example, the MSCs 140 may include remote data servers.

As appreciated by those skilled in the art, the mobile wireless network system includes various cell tower/base station/MSC arrangements. For example, a base station and a cell tower could be located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144, databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The telecommunications equipment 150 includes, for example, an encoder, and can be communicatively connected to various devices such as the servers 144 and the databases 146. For example, the databases 146 comprise computer hardware and stored programs configured to store subscriber profile records, subscriber behavioral patterns, and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions and/or applications installed on the telematics unit, and operations performed at the communications center may be carried out according to stored instructions and/or applications installed at the communications center.

Figure 2:
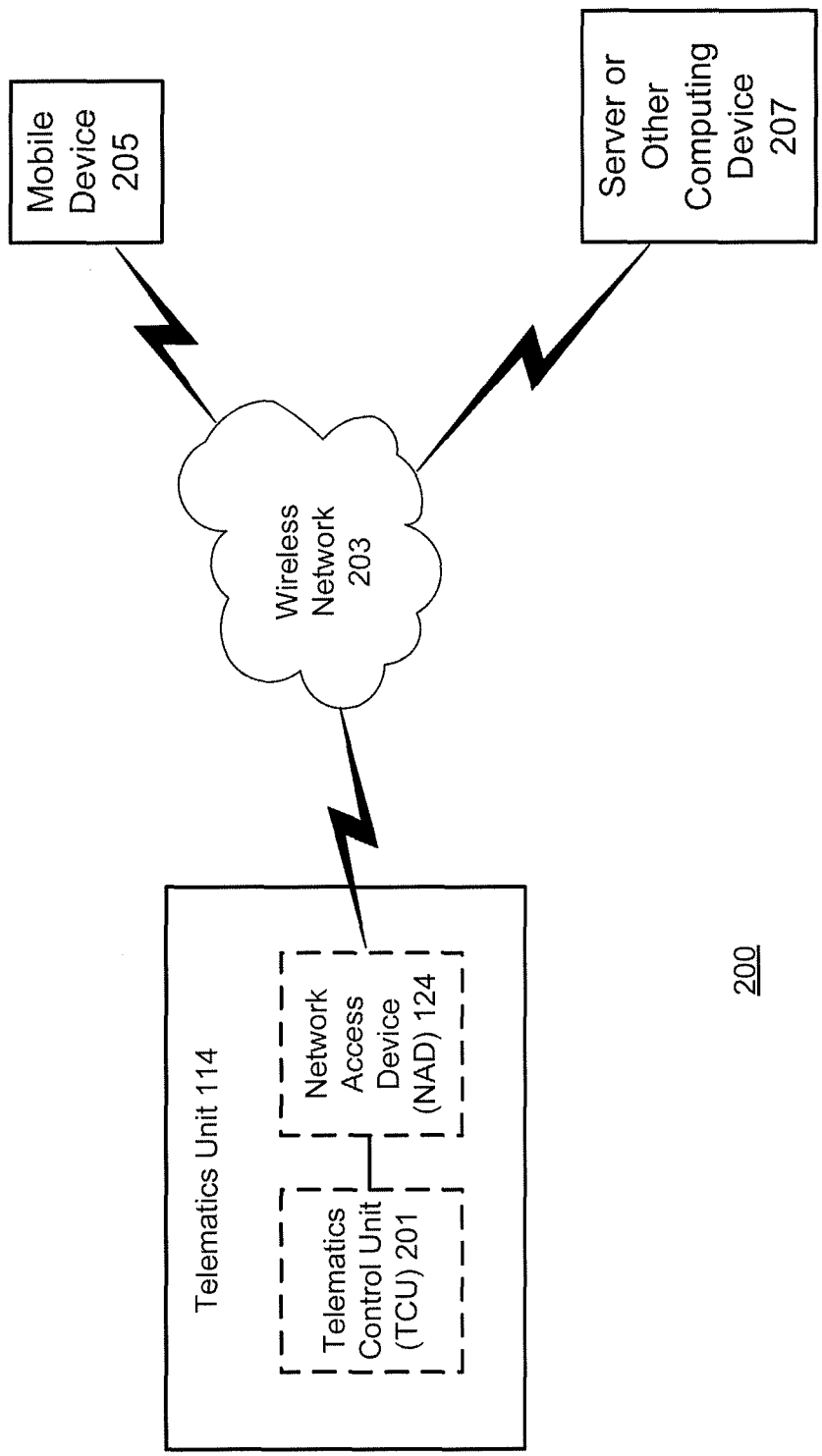
FIG. 2 is a simplified schematic diagram of an operating environment usable in implementations of the described principles.

With further reference to the exemplary environment 100 illustrated in FIG. 1, and turning more specifically to FIG. 2, a simplified diagram 200 is depicted that illustrates components and devices that are specifically relevant to describing the general principles of exemplary implementations of the invention. These exemplary implementations of the invention relate to, for example, operations involving a telematics unit 114 and a mobile device 205, operations involving a telematics unit 114 and a server or other computing device 207, and/or operations involving a telematics unit 114 and a mobile device 205 facilitated by a server or other computing device 207.

In an exemplary server-based implementation, the telematics unit 114 communicates with a server 207 to inform the server 207 as to status (including location) of a telematics-equipped vehicle, to receive information regarding status of a mobile device 205 (the mobile device also informs the server of its status, including location), and to receive notifications to implement and/or adjust certain energy management routines (i.e., energy management control is provided by the server). In one particular example, the telematics unit and NAD wake up periodically during a DRx mode (e.g., at an interval somewhere between every 3 minutes and every 30 minutes), and upon waking up, the telematics unit registers with the network, queries the server about the location of the mobile device, and the telematics unit is then instructed to modify its energy management routine accordingly by the server. The mobile device updates the server as to its position periodically or on an event-driven basis (e.g., triggered by a significant change in position or a significant change in proximity to the last known location of the vehicle).

In an exemplary mobile device-based implementation, the telematics unit 114 communicates with an application executed on the mobile device 205 to inform the mobile device 205 of the telematics unit's status (including location) and corresponding vehicle's status (e.g., ignition on or off), to receive information regarding location of the mobile device 205, and to receive notifications to implement and/or adjust certain energy management routines (i.e., energy management control is provided by the mobile device application).

In yet another exemplary implementation, the telematics unit 114 determines whether to implement and/or adjust certain energy management routines based on mobile device location information received from the mobile device 205 or a server 207, and further based on other information determined by the telematics unit 114, including but not limited to other information received by or stored at the telematics unit 114 (i.e., energy management control is provided by the telematics unit itself).

Additionally, in FIG. 2, the telematics unit 114, mobile device 205, and server or other computing device 207 are depicted as communicating via a wireless network 203. It will be appreciated that wireless network 203 may be any type of wireless communications network, such as those discussed above with respect to element 104 of FIG. 1. Also, in FIG. 2, the telematics unit 114 is shown as comprising the network access device (NAD) 124 as well as a "telematics control unit" (TCU) 201. It will be appreciated that, in the context of the present disclosure, a "TCU" of a telematics unit as referred to herein comprises processing and memory components of a telematics unit (including, for example, components of the telematics unit that communicate with other vehicle components via a vehicle bus), but a "TCU" does not include the NAD of the telematics unit.

Figure 3:
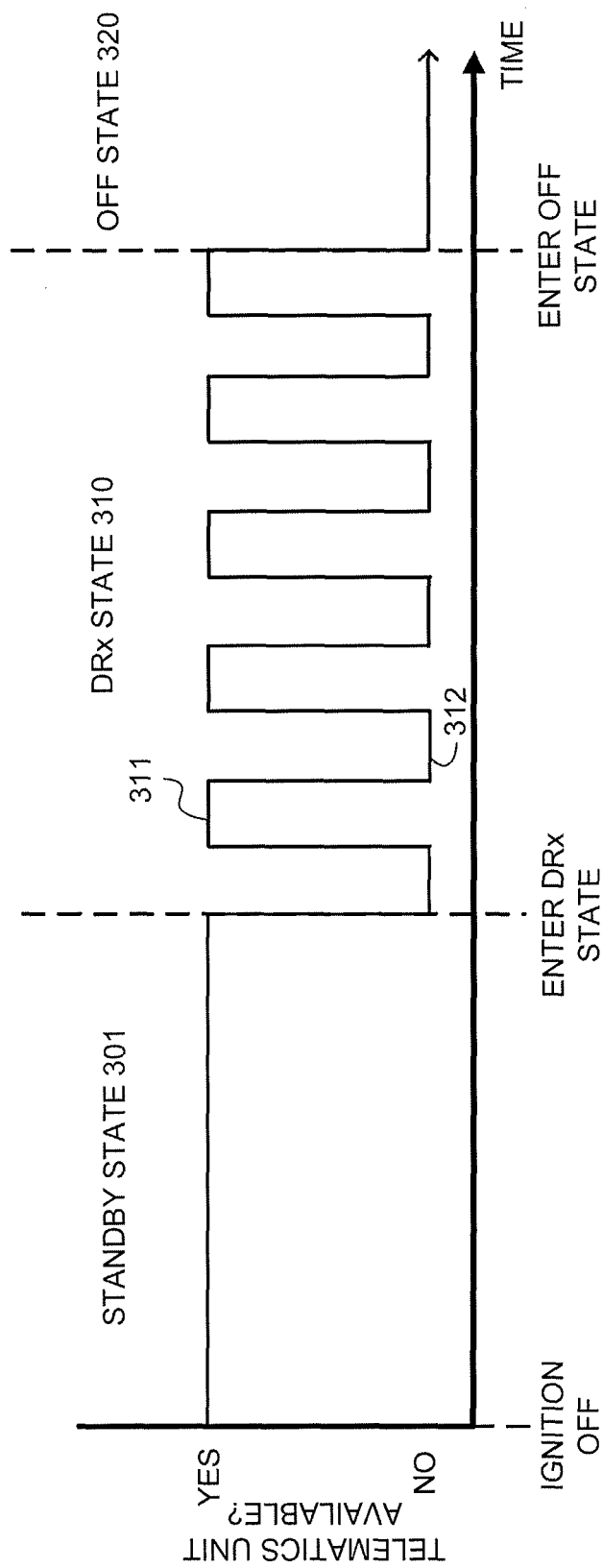
FIG. 3 is an exemplary plot illustrating different telematics unit states over time after vehicle ignition is turned off.

FIG. 3 is an exemplary plot 300 that illustrates the standby state 301, DRx state 310, and Off state 320 for a telematics unit. In this example, after the vehicle's ignition is turned off, the telematics unit enters a standby state 301 for a period of time where the telematics unit is available for communications and capable of receiving commands. During the period of time corresponding to the standby state 301, the NAD of the telematics unit is on. At a later point in time, the telematics unit enters the DRx state 310, and for a period of time corresponding to the DRx state 310, the telematics unit cycles between being available for communications and being unavailable for communications. Each DRx cycle includes an on duration 311 (where at least the NAD of the telematics unit is on and capable of receiving communications) and an off duration 312 (where the NAD of the telematics unit is off and not capable of receiving communications). Eventually, the telematics unit enters an Off state 320, where the NAD of the telematics unit is off and unavailable for communications. The telematics unit remains in the Off state 320 indefinitely until the vehicle ignition is turned back on (or some other triggering event occurs to bring the telematics unit out of the Off state 320).

According to certain exemplary implementation of the invention, while the telematics unit is in the DRx state 310, the telematics unit is synchronized with mobile devices or servers that wish to communicate with the telematics unit such that the mobile devices or servers can determine when the NAD of the telematics unit will be on and will only send commands during those time windows while the telematics unit is in the DRx state 310. For example, in one implementation, a mobile device that needs to send a command to the telematics unit but knows that the telematics unit is in the DRx state 310 will send the command at a particular time (e.g., between a time corresponding to xx:xx:00 and xx:xx:10 (hh:mm:ss format)) corresponding to a particular time at which the NAD of the telematics unit will be on according to the configuration of the DRx state for the telematics unit.

It will be appreciated that, at any time during this exemplary post-ignition-off energy management schedule, if the vehicle ignition is turned back on, the telematics unit breaks from the schedule and enters an "awake" state independent from the schedule. And, upon another ignition-off event, and the post-ignition-off energy schedule will start over from the beginning (assuming the vehicle battery was able to be charged in full while the ignition was on; if not, the post-ignition-off energy schedule may start from some intermediate point in the schedule to account for the level of charge in the battery).

It will further be appreciated that FIG. 3 is merely an example of post-ignition-off telematics unit energy management. For example, in another implementation, there may be no standby state 301 at all, and after vehicle ignition off, the telematics unit may immediately transition to a DRx state 310 or to an Off state 320. Often, vehicles are designed taking into account the fact that there are a number of vehicle components that draw energy from the vehicle battery while the vehicle ignition is off, and such components, such as a telematics unit, are allocated an energy budget. Various combinations of lengths for the standby state period and the DRx state period (as well as the length for each on-portion of a DRx cycle and the period of time corresponding to a DRx cycle) may satisfy the criteria imposed by the energy budget, and a particular default post-ignition-off energy management schedule comprising a standby state period and/or a DRx state period may be selected based on generally-expected user needs.

Implementations of the invention provide for automatic determination and/or adjustment to provide situation-specific post-ignition-off energy management. In certain exemplary implementations, the invention provides for selection of a particular type of post-ignition-off energy management schedule (e.g., "normal", "extended", or "abbreviated" as discussed in further detail below) based on vehicle location information and/or mobile device information, as well as providing for adjustment of the selected post-ignition-off energy management schedule (e.g., by selecting a different schedule type) based on monitoring mobile device location information. In other certain exemplary implementations, the invention provides for implementation of a particular post-ignition-off energy management schedule based on a particular determined situation (or implementation of a default post-ignition-off energy management schedule), followed by subsequent adjustments to that schedule based on updated situation information.

Figure 4:
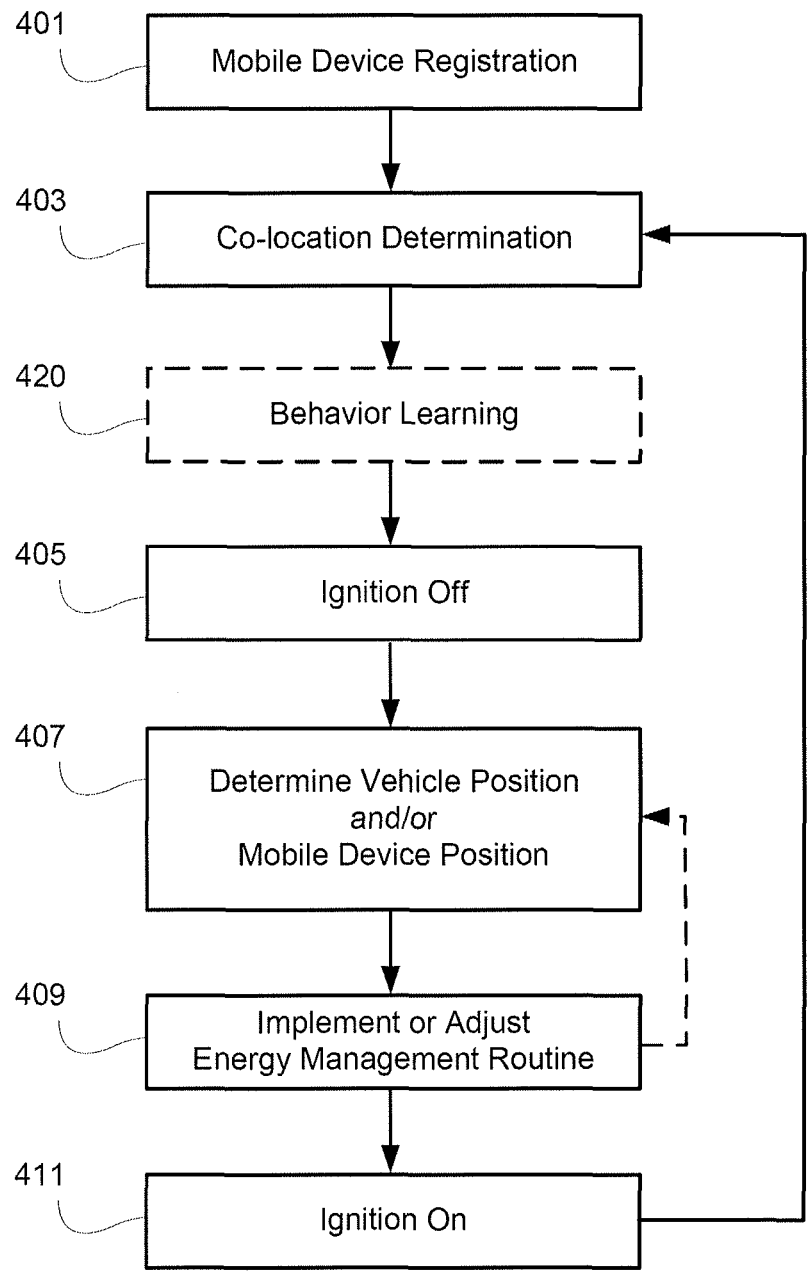
FIG. 4 is a flowchart illustrating an exemplary process for implementing and/or adjusting post-ignition-off energy management routines in accordance with an implementation of the described principles.

Turning now to FIG. 4, an exemplary process 400 is depicted corresponding to a particular exemplary implementation for post-ignition-off telematics unit energy management. At stage 401, a mobile device, for example the mobile device of a user of the telematics unit, is registered as corresponding to the telematics unit. Storage of this registration information may be implemented at the telematics unit itself, the mobile device, or a server or some other computing device. It will be appreciated that more than one mobile device may be registered as corresponding to a telematics unit, and that registration records (and in certain implementations, behavior and location information) may be stored for each mobile device.

Registration of a mobile device with the telematics unit facilitates the provision of situation-specific post-ignition-off energy management an energy management platform (carried out by the mobile device, by the telematics unit, by a server, or by some combination thereof). Based on mobile device location information determined by the mobile device and vehicle location information determined by the telematics unit, a co-location determination that the registered mobile device co-located with the vehicle while the vehicle is traveling is made at stage 403 (e.g., by determining that the mobile device and the vehicle are traveling according to a similar pattern for at least a certain period of time). The knowledge that the registered mobile device is co-located with the vehicle up to and at the point at which the vehicle ignition is turned off at stage 405 allows for personalized situation-specific implementation and adjustment of energy management procedures at stage 409 (as well as behavior learning at stage 420).

Specifically, in this exemplary process 400, after it is determined that the mobile device is co-located with the vehicle up to the point of vehicle ignition being turned off at stage 405, a determination is made as to the vehicle's position when the vehicle is turned off at stage 407. Additionally, further monitoring of the mobile device location may be performed at stage 407 to determine whether the mobile device is proximate to the vehicle or not (i.e., whether the mobile device is within a certain distance of the vehicle). Based on these determinations at stage 407, an appropriate energy management procedure specifically suited to the particular situation is implemented, and may further be adjusted based on updates to the mobile device's proximity to the vehicle. The energy management procedure may or may not be adjusted during implementation, and is implemented until the vehicle ignition is turned on at stage 411 (or until some other triggering event occurs). The process 400 may then be repeated for the registered mobile device with respect to co-location determination at stage 403 and the other subsequent steps.

Figure 5:
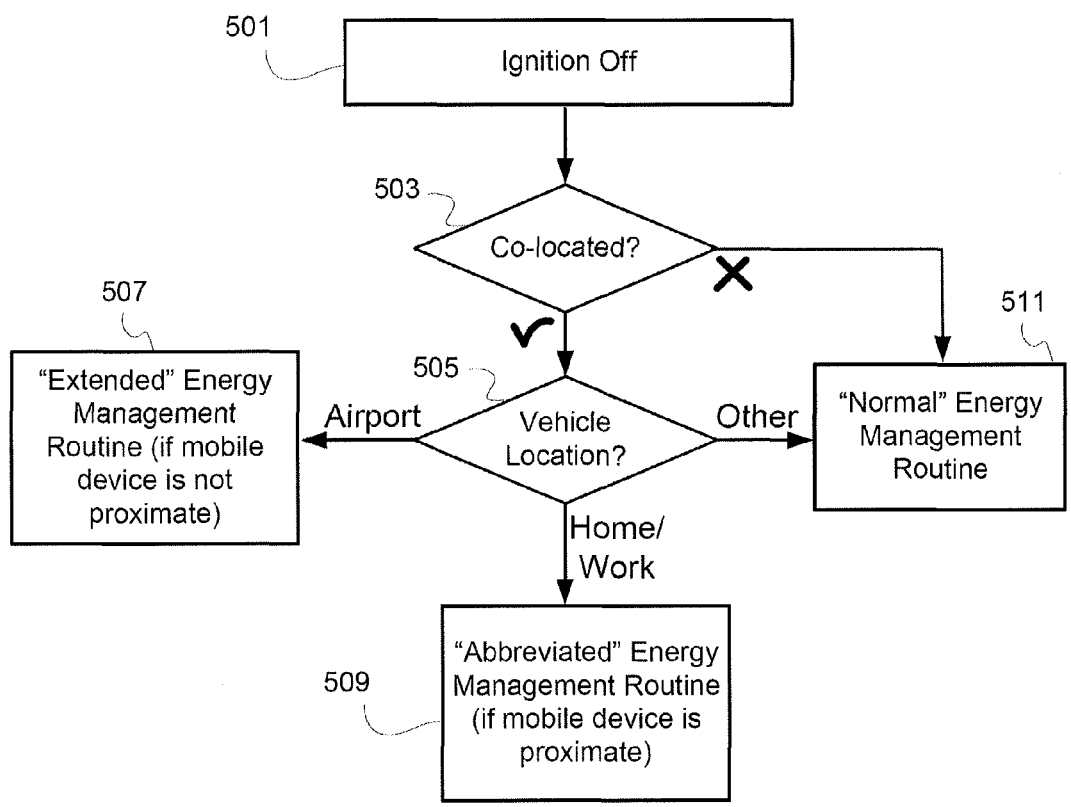
FIG. 5 is a flowchart illustrating exemplary outcomes corresponding to the exemplary process depicted in FIG. 4 in further detail in accordance with an implementation of the described principles.

The process 400 may be better understood in combination with the exemplary outcomes shown in the flowchart 500 of FIG. 5. Flowchart 500 begins with an ignition off event at stage 501. In this example, whether it was determined that the mobile device was co-located with the vehicle during travel and up to the point of ignition off at stage 501 (stage 503) affects how the energy management platform will implement energy management procedures for the telematics unit of the vehicle.

In the case that the mobile device was co-located with the vehicle, the energy management platform uses specific information corresponding to the mobile device for providing personalized situation-specific energy management. In this example, the energy management platform has "home" and/or "work" location information corresponding to the registered mobile device. When it is determined that the vehicle's ignition was turned off while at home or at work (stage 505), the telematics unit executes an "abbreviated" energy management routine based on this information where, in one example, during the DRx state, the NAD of the telematics unit cycles between being on and off while the TCU of the telematics unit stays in a powered on state (this is in contrast to a "normal" energy management procedure where during the DRx state, the TCU stays powered down, and consumes more energy than the "normal" energy management procedure). The "abbreviated" energy management routine may further utilize shorter DRx cycles for the DRx state, as well as utilizing a relatively longer standby period relative to the "normal" energy management routine.

The energy management platform makes the determination that the vehicle is at a home location or work location corresponding to the user's mobile device based on stored information corresponding to the user. This information may be input into the storage system, for example, by the user or some other entity, or may be learned based on the behavior learning at stage 420. For example, using machine-learning algorithms, the energy management platform tracks behavior corresponding to a registered mobile device after determining that the registered mobile device is co-located with the vehicle at stage 403, and based on frequency and timing of travel, identifies the home and work locations corresponding to the registered mobile device (or, alternatively, identifies these locations as frequently visited locations corresponding to particular times).

This "abbreviated" energy management routine is particularly advantageous when the user is proximate to the vehicle and during periods when the user is likely to need to use the vehicle. For example, on a weekday morning when a user is about to commute to work, and the user wishes to use a mobile device application to unlock the doors to the vehicle and start the engine of the vehicle, it is advantageous for the TCU to already be on to implement those commands so as to avoid delay caused by booting up the TCU. For similar reason, it is advantageous to use shorter DRx cycles and/or a longer standby state period.

Accordingly, implementing the "abbreviated" energy management routine at stage 509 may further be conditioned on the user being proximate to the vehicle. In one exemplary implementation, a user having a co-located registered mobile device turns the vehicle ignition off after reaching a work location (stage 405), but then later leaves the work location. Initially, the location of the vehicle is determined to be at work (stage 407) and the location of the registered mobile device is determined to be proximate to the vehicle (stage 407), and thus the energy management platform causes the telematics unit to execute "abbreviated" energy management (stage 509). Later, through monitoring of the location of the registered mobile device, the energy management platform determines that the mobile device position is no longer proximate to the vehicle location (e.g., more than x miles away) and adjusts the energy management routine by changing it to the "normal" energy management routine (or, in certain implementations, by changing it to the "extended" energy management routine, for example if the mobile device is determined to be y miles away where y is greater than x).

In a further implementation, implementing the "abbreviated" energy management routine at stage 509 may further be based on the timing of the user's past behavior (as learned by the energy management platform at stage 420). In an example, the registered mobile device arrives at the work location at 9:00 am and leaves at around 5:00 pm each weekday. The energy management platform has learned this behavior at stage 420 based on the registered mobile device being co-located with the vehicle, and imposed an additional condition where the "abbreviated" energy management routine is to be implemented when the vehicle location is at work, when the user is proximate, and between 4:30 pm to 5:30 pm on weekdays (since this corresponds to a time where it is likely that the user of the mobile device will want to access his or her vehicle). Thus, when the vehicle arrives at the work location at 9:00 am on a weekday with the co-located registered mobile device, the energy management platform does not implement the "abbreviated" energy management routine but rather implements, for example, the "normal" or "extended" energy management routine until 4:30 pm. At 4:30 pm, the energy management platform then adjusts the energy management routine by changing it to the "abbreviated" energy management routine (assuming the mobile device location is proximate at that time). It will be appreciated that the foregoing example is intended to be exemplary, and that one skilled in the art could vary the implementation details of an energy management process without departing from the inventive principles described herein.

In a further implementation, adjustments of the energy management routine may be made based on an expected return time at which the energy management platform expects the user of the mobile device to go to the vehicle (e.g., based on machine learning and/or the user's work schedule). When the user does not return to the vehicle at the expected time (e.g., if the user stays late at work), the energy management routine which was in an "abbreviated" mode based on the user being at work may be adjusted to go into the "normal" mode (e.g., at a point of the "normal" energy management routine based on the remaining energy left when the energy management platform switches the telematics unit from the "abbreviated" mode to the "normal" mode).

In another further implementation, transitions between different modes of energy management routines may be based on other factors as well, such as the vehicle battery state of charge falling below a threshold. The threshold may be dynamically adjusted based on parameters such as battery age, outside temperature, total capacity, etc. For example, if use of the "abbreviated" energy management routine while the user is at work consumes energy at a particularly fast rate under the present conditions (e.g., for an old battery on a hot day), the energy management platform may set the threshold to be higher and transition to a "normal" or even "extended" energy management routine while the user is at work to prevent the "abbreviated" energy management routine that would otherwise have been used from excessively depleting the vehicle battery.

In another example, if at stage 407, the vehicle's location is determined to be an airport (or other transit center), and the co-located mobile device is at some point determined to be not proximate to the vehicle (e.g., more than a certain distance away), the telematics unit implements an "extended" energy management routine (stage 507). In one example, the "extended" energy management routine provides for DRx cycles with longer periods and smaller duty cycles (i.e., to extend the length at which the telematics unit can remain in a DRx state for a given energy budget), and may further include shortening or eliminating of a standby state. If a user of a registered mobile device co-located with the vehicle travels to an airport, turns off the vehicle ignition, and then gets on a plane and flies to a location that is far away, it is not likely that the user will need to use the vehicle or any telematics-related operations associated with the vehicle in the near future. Accordingly, based on the determination that the vehicle is at the airport and that the registered mobile device is far away, the energy management platform determines that implementation of the "extended" energy management routine is appropriate for this situation.

In other situations, the energy management routine implements a "normal" or default energy management routine that is not specific to a particular situation and may be optimized based on a particular user's or users in general's behavior patterns (stage 511). This "normal" or default energy management routine is also used there is no registered mobile device co-located with the vehicle when the vehicle ignition is turned off (stage 503), as the energy management platform may not have enough information regarding who was in the vehicle in this case to implement a personalized or situation-specific energy management routine.

In further implementations of the invention, personalized and situation-specific adjustment/implementation of energy management routines involves more than just selecting between "abbreviated," "normal," and "extended" energy management routines. For example, parameters—including but not limited to overall duration of standby state period; overall duration of DRx state period; length of the on-portion of a DRx cycle; length of the off-portion of a DRx cycle; length of a DRx cycle; powered on/off status of the TCU of the telematics unit (or other telematics unit components and/or vehicle components)—may each be dynamically adjusted to fit a particular set of circumstances. For example, a sliding scale may be used that adjusts the length of the standby state period inversely proportionally to the distance away from the vehicle of a registered mobile device. Further, some combination of these different approaches could also be used—for example, implementing the "extended" energy management routine and then adjusting the length of the standby state period just for the "extended" energy management routine based on the degree of how far the registered mobile device is from the vehicle.

In certain alternate implementations of the invention, co-location determination (and even mobile device registration) may not be necessary for situation-specific energy management. In one example, the energy management platform responds to a determination that the vehicle is turned off in a long-term parking area of an airport by implementing an "extended" energy management routine regardless of whether it previously determined a registered mobile device was co-located with the vehicle during travel or not. In another example, the energy management platform responds to a determination that the vehicle is turned off while located at a restaurant by implementing an "abbreviated" energy management routine regardless of whether it previously determined a registered mobile device was co-located with the vehicle during travel or not. It will be appreciated that these implementations may stand alone with the previously described implementations involving co-location and registration, or may be combined with those previously described implementations (e.g., by adding additional hypothetical outcome branches to be added to the flowchart 500 of FIG. 5 based on particular sets of circumstances).

In yet another alternative exemplary implementation, a determination as to proximity of a registered mobile device that is co-located with the vehicle during travel is all that is needed to determine whether to use the "abbreviated," "normal," or "extended" energy management routine (in contrast to using specific identifications of location or identifications of frequently-visited locations in the past). For example, after determining that a registered mobile device is co-located at stage 403 and turning the vehicle ignition off at stage 405, implementation and/or adjustment of the energy management routine (at stage 409) is based only on how far the mobile device is determined to be from the determined vehicle position at ignition off. Thus, for example, as the registered mobile device moves from being at the parked ignition-off vehicle to a distance far away from the parked ignition-off vehicle, and then back again, the energy management platform implements "abbreviated," "normal," "extended," "normal," and then "abbreviated" energy management routines in that order as the registered mobile device traverses each distance threshold on the way out and back.

In an exemplary implementation, the "abbreviated" energy management routine includes the telematics unit running, with the NAD listening according to a DRx mode allowed by a wireless standard utilized by a wireless provider; the "normal" energy management routine includes the telematics unit powered down, with the NAD listening according to a DRx mode allowed by the wireless standard; and the "extended" energy management routine includes the telematics unit powered down, with the NAD listening according to a DRx mode where the NAD listens less often than is allowed by the wireless standard. As such, the "extended" energy management routine may violate the wireless provider's policies and be prohibited by the wireless provider, as the wireless network is expecting the NAD to listen for pages at agreed-upon time. This may cause potential network issues when the NAD is paged at a time where the NAD is not listening since the network will use additional resources to try and broadcast the page if the page fails. However, because implementations of the invention synchronize paging of the NAD with the entities that will be paging the NAD, as discussed above, these potential network issues should be virtually non-existent (regardless of whether the energy management intelligence is implemented at a server, at a telematics unit, or on a mobile device, as discussed above).

It will thus be appreciated that the described systems and methods allow for efficient implementations and adjustment of post-ignition-off energy management routines with respect to telematics units. It will also be appreciated, however, that the foregoing methods and implementations are merely examples of the inventive principles, and that these illustrate only preferred techniques.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for energy management for a telematics unit of a telematics-equipped vehicle, the method comprising:
   determining, by a processor, that a mobile device is co-located with the telematics unit while vehicle ignition of the vehicle is on, wherein the mobile device is registered as being associated with the telematics unit;
   determining, by the processor, that the vehicle ignition has been turned off;
   determining, by the processor, after determining that the vehicle ignition has been turned off, both:
      a location of the vehicle corresponding to where the vehicle ignition was turned off, and
      a location of the mobile device; and
   implementing, by the processor, situation-specific energy management based on the determined locations of both the vehicle and the mobile device.

2. The method of claim 1, wherein the implementing further comprises:
   identifying the determined location of the vehicle; and
   selecting an energy management routine from a plurality of energy management routines based on the identifying.

3. The method of claim 2, wherein the plurality of energy management routines include a first energy management routine comprising a discontinuous receive (DRx) period and a second energy management routine comprising a DRx period, the DRx period of the second energy management routine being longer than the DRx period of the first energy management routine and having a lower duty cycle than the DRx period of the first energy management routine;
   wherein the identifying comprises identifying the determined location of the vehicle as an airport or other transit center; and
   wherein the selecting comprises selecting the second energy management routine based on the identified location being an airport or other transit center.

4. The method of claim 2, wherein the plurality of energy management routines include a first energy management routine comprising a discontinuous receive (DRx) period and a second energy management routine comprising a DRx period, the DRx period of the second energy management routine being longer than the DRx period of the first energy management routine and having a lower duty cycle than the DRx period of the first energy management routine;
   wherein the identifying comprises identifying the determined location of the vehicle at ignition off as an airport or other transit center; and
   wherein the implementing further comprises monitoring the location of the mobile device and determining whether the monitored location of the mobile device is within a defined vicinity of the vehicle;
   wherein the selecting comprises selecting the first energy management routine while the mobile device is determined to be within the defined vicinity of the vehicle and selecting the second energy management routine while the mobile device is not determined to be within the defined vicinity of the vehicle.

5. The method of claim 2, wherein the plurality of energy management routines include a first energy management routine comprising a discontinuous receive (DRx) period and a second energy management routine comprising a DRx period, wherein a telematics control unit (TCU) of the telematics unit is powered on by default according to the DRx period of the first energy management routine and the TCU is powered off by default according to the DRx period of the second energy management routine;
   wherein the identifying comprises identifying the determined location of the vehicle as a home or work location corresponding to the mobile device; and
   wherein the selecting comprises selecting the first energy management routine based on the identified location being a home or work location corresponding to the mobile device.

6. The method of claim 2, wherein the plurality of energy management routines include a first energy management routine comprising a discontinuous receive (DRx) period and a second energy management routine comprising a DRx period, wherein a telematics control unit (TCU) of the telematics unit is powered on by default according to the DRx period of the first energy management routine and the TCU is powered off by default according to the DRx period of the second energy management routine;
   wherein the identifying comprises identifying the determined location of the vehicle as a home or work location corresponding to the mobile device; and
   wherein the implementing further comprises monitoring the location of the mobile device and determining whether the monitored location of the mobile device is within a defined vicinity of the vehicle;
   wherein the selecting comprises selecting the first energy management routine while the mobile device is determined to be within the defined vicinity of the vehicle and selecting the second energy management routine while the mobile device is not determined to be within the defined vicinity of the vehicle.

7. The method of claim 1, wherein the implementing comprises adjusting at least one parameter from the group consisting of:
a length of a standby period of an energy management routine;
a length of a discontinuous receive (DRx) period of an energy management routine;
a length of an on portion of a DRx cycle for a DRx period of an energy management routine;
a length of an off portion of a DRx cycle for a DRx period of an energy management routine;
a duty cycle for a DRx period of an energy management routine; and
a default parameter corresponding to whether a telematics control unit (TCU) of the telematics unit is to remain powered on or powered off during a DRx period of an energy management routine.

8. The method of claim 1, further comprising:
storing, in response to the determining that the mobile device is co-located with the telematics unit, information pertaining to movement patterns of the co-located mobile device and telematics unit;
wherein implementing situation-specific energy management is further based on predicted use of the telematics unit based on the stored information.

9. The method of claim 1, wherein the processor is part of a server;
wherein determining that the mobile device is co-located with the telematics unit is based on location information received by the server from the mobile device and location information received by the server from the telematics unit while the vehicle ignition is on; and
wherein implementing situation-specific energy management comprises the server transmitting instructions to the telematics unit regarding an energy management routine to be implemented by the telematics unit.

10. The method of claim 1, wherein the processor is part of the mobile device;
wherein determining that the mobile device is co-located with the telematics unit is based on location information received by the mobile device from the telematics unit while the vehicle ignition is on; and
wherein implementing situation-specific energy management comprises the mobile device transmitting instructions to the telematics unit regarding an energy management routine to be implemented by the telematics unit.

11. A non-transitory computer-readable medium having processor-executable instructions stored thereon for energy management for a telematics unit of a telematics-equipped vehicle, the processor-executable instructions comprising instructions for:
determining that a mobile device is co-located with the telematics unit while vehicle ignition of the vehicle is on, wherein the mobile device is registered as being associated with the telematics unit;
determining that the vehicle ignition has been turned off;
after determining that the vehicle ignition has been turned off, determining both a location of the vehicle corresponding to where the vehicle ignition was turned off and a location of the mobile device; and
implementing situation-specific energy management based on the determined locations of the vehicle and the mobile device.

12. The non-transitory computer-readable medium of claim 11, wherein the implementing further comprises:
identifying the determined location of the vehicle; and
selecting an energy management routine from a plurality of energy management routines based on the identifying.

13. The non-transitory computer-readable medium of claim 12, wherein the plurality of energy management routines include a first energy management routine comprising a discontinuous receive (DRx) period and a second energy management routine comprising a DRx period, the DRx period of the second energy management routine being longer than the DRx period of the first energy management routine and having a lower duty cycle than the DRx period of the first energy management routine;
wherein the identifying comprises identifying the determined location of the vehicle as an airport or other transit center; and
wherein the selecting comprises selecting the second energy management routine based on the identified location being an airport or other transit center.

14. The non-transitory computer-readable medium of claim 12, wherein the plurality of energy management routines include a first energy management routine comprising a discontinuous receive (DRx) period and a second energy management routine comprising a DRx period, the DRx period of the second energy management routine being longer than the DRx period of the first energy management routine and having a lower duty cycle than the DRx period of the first energy management routine;
wherein the identifying comprises identifying the determined location of the vehicle at ignition off as an airport or other transit center; and
wherein the implementing further comprises monitoring the location of the mobile device and determining whether the monitored location of the mobile device is within a defined vicinity of the vehicle;
wherein the selecting comprises selecting the first energy management routine while the mobile device is determined to be within the defined vicinity of the vehicle and selecting the second energy management routine while the mobile device is not determined to be within the defined vicinity of the vehicle.

15. The non-transitory computer-readable medium of claim 12, wherein the plurality of energy management routines include a first energy management routine comprising a discontinuous receive (DRx) period and a second energy management routine comprising a DRx period, wherein a telematics control unit (TCU) of the telematics unit is powered on by default according to the DRx period of the first energy management routine and the TCU is powered off by default according to the DRx period of the second energy management routine;
wherein the identifying comprises identifying the determined location of the vehicle as a home or work location corresponding to the mobile device; and
wherein the selecting comprises selecting the first energy management routine based on the identified location being a home or work location corresponding to the mobile device.

16. The non-transitory computer-readable medium of claim 12, wherein the plurality of energy management routines include a first energy management routine comprising a discontinuous receive (DRx) period and a second energy management routine comprising a DRx period, wherein a telematics control unit (TCU) of the telematics unit is powered on by default according to the DRx period of the first energy management routine and the TCU is powered off by default according to the DRx period of the second energy management routine;

wherein the identifying comprises identifying the determined location of the vehicle as a home or work location corresponding to the mobile device; and wherein the implementing further comprises monitoring the location of the mobile device and determining whether the monitored location of the mobile device is within a defined vicinity of the vehicle;

wherein the selecting comprises selecting the first energy management routine while the mobile device is determined to be within the defined vicinity of the vehicle and selecting the second energy management routine while the mobile device is not determined to be within the defined vicinity of the vehicle.

17. The non-transitory computer-readable medium of claim 11, wherein the implementing comprises adjusting at least one parameter from the group consisting of:
- a length of a standby period of an energy management routine;
- a length of a discontinuous receive (DRx) period of an energy management routine;
- a length of an on portion of a DRx cycle for a DRx period of an energy management routine;
- a length of an off portion of a DRx cycle for a DRx period of an energy management routine;
- a duty cycle for a DRx period of an energy management routine; and
- a default parameter corresponding to whether a telematics control unit (TCU) of the telematics unit is to remain powered on or powered off during a DRx period of an energy management routine.

18. The non-transitory computer-readable medium of claim 11, wherein the processor-executable instructions further comprise instructions for:
- storing, in response to the determining that the mobile device is co-located with the telematics unit, information pertaining to movement patterns of the co-located mobile device and telematics unit;

wherein implementing situation-specific energy management is further based on predicted use of the telematics unit based on the stored information.

19. The non-transitory computer-readable medium of claim 11, wherein the non-transitory processor-readable medium is part of a server;

wherein determining that the mobile device is co-located with the telematics unit is based on location information received by the server from the mobile device and location information received by the server from the telematics unit while the vehicle ignition is on; and wherein implementing situation-specific energy management comprises the server transmitting instructions to the telematics unit regarding an energy management routine to be implemented by the telematics unit.

20. The non-transitory computer-readable medium of claim 11, wherein the non-transitory processor-readable medium is part of the mobile device;

wherein determining that the mobile device is co-located with the telematics unit is based on location information received by the mobile device from the telematics unit while the vehicle ignition is on; and wherein implementing situation-specific energy management comprises the mobile device transmitting instructions to the telematics unit regarding an energy management routine to be implemented by the telematics unit.

* * * * *